(No Model.)

I. A. TIMMIS.
SECONDARY BATTERY.

No. 545,390. Patented Aug. 27, 1895.

Witnesses:

Inventor
Illius A. Timmis
by Connolly Bros.
Attorneys.

UNITED STATES PATENT OFFICE.

ILLIUS A. TIMMIS, OF LONDON, ENGLAND.

SECONDARY BATTERY.

SPECIFICATION forming part of Letters Patent No. 545,390, dated August 27, 1895.

Application filed February 28, 1895. Serial No. 540,126. (No model.)

*To all whom it may concern:*

Be it known that I, ILLIUS A. TIMMIS, a subject of the Queen of Great Britain, residing at No. 2 Great George Street, Westminster, in the county of Middlesex, London, England, have invented Improvements in Secondary Batteries, of which the following is a specification.

The objects of my invention are to construct the elements of electric secondary batteries so that they shall be lighter than at present, also so that they shall be cheaply made, efficient in working, and have a long life.

My invention consists in the novel construction of a battery element, as hereinafter described and claimed.

Figure 1:
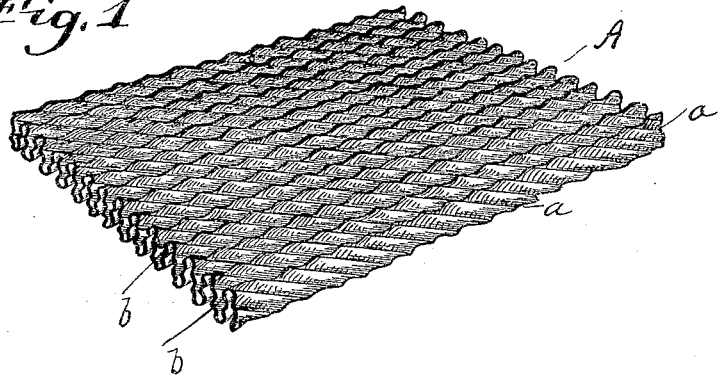
Figure 2:
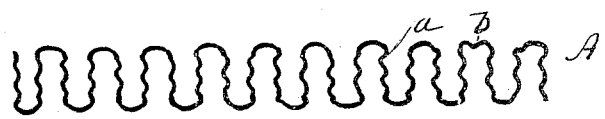

In the accompanying drawings, Figure 1 is perspective view of a battery element embodying my invention; and Fig. 2 is a transverse sectional view of the same.

It is well known that batteries made of cells or elements after the Planté type are heavy and costly to make ready for use, and many schemes have been contrived and many patents taken out to use thin sheets of lead folded in various ways; but I believe that the following invention is new. I take a sheet of lead, say .022 inch in thickness, and corrugate it in ridges of, say, .125-inch pitch. I cut the lead sheet in strips of say 2.5 inches width. The corrugation may be rolled or made in the sheet after it is cut into strips and they are at an angle of, say, forty-five degrees to the sides or length of the strips, and are preferably uninterrupted or continuous, as shown in the drawings.

The above dimensions and all those mentioned hereinafter may be varied as desired. I give those I have worked to. I then take one of these strips and bend or plait it in layers of, say, .3 inch in width, such bends or plaits being preferably continuous or unbroken, as shown in the drawings. The corrugation of the two surfaces that are opposite each other in all the layers cross each other transversely. The corrugations serve to strengthen the strips and the block in every direction enormously, and also to allow the electrolyte to permeate into and against all the surface of the lead strip. In other words, when the plaits are formed every part of the material, or nearly so, becomes active material, and thus the maximum amount of storage is obtained for a given weight of material, together with great strength. Thus one strip forms one block or section of a plate and any convenient number of sections and of any suitable size may be formed with one plate.

In the accompanying drawings, A designates the corrugated and folded battery element, in which $a$ are the corrugations, formed in parallel series at an acute angle to the edges of the sheet, and $b$ are the plaits or folds into which the plate is bent after the corrugations have been formed, these plaits or folds forming acute angles with the corrugations $a$. As a result from the corrugating and folding of the plate at relatively acute angles the two surfaces of the folds, where they are opposed to each other, form pockets by reason of the different portions of the corrugations crossing each other at angles. These blocks are spaced a given distance apart. They are then joined by connecting-pieces of lead burned in by preference. These plates after being formed and worked for a given time, can be reversed and the life of the cell proportionally increased.

By the above means, first, the great evil of buckling is obviated and enormous strength attained; second, the expansion which takes place allows the active material, as it forms, room to "grow" and remain in the grooves without a tendency to fall out; third, the plates are capable of being formed cheaply and then being charged and discharged very rapidly; fourth, the plates are reversible, as the positive plate can be reversed when getting worn and the negative plate made positive, and thus the life of the cells enormously increased; fifth, the first cost of a battery of these plates is very small compared with that of any other system.

What I claim, and desire to secure by Letters Patent, is—

1. An element for secondary batteries consisting of a thin sheet of metal corrugated in parallel uninterrupted continuous lines, and folded or plaited in continuous lines intersecting the corrugations, substantially as described.

2. An element for secondary batteries consisting of a thin sheet of metal bent into folds or plaits and having linear indentations parallel to each other and intersecting the faces of the plaits at an acute angle to the lines of the latter, substantially as described.

3. An element for secondary batteries consisting of a thin sheet of metal having a series of oblique or diagonal linear corrugations or indentations and folded or plaited in lines parallel with one of the edges of the sheet, substantially as described.

In witness whereof I have hereunto set my hand, this 18th day of January, 1895, in the presence of the undersigned two witnesses.

I. A. TIMMIS.

Witnesses:
 E. GOBERT,
 R. JOHNSON.